(12) United States Patent
Fowler et al.

(10) Patent No.: US 7,852,997 B2
(45) Date of Patent: Dec. 14, 2010

(54) INTERNET TELEPHONY COMMUNICATIONS ADAPTER FOR WEB BROWSERS

(75) Inventors: Brian Fowler, Sunrise, FL (US); Leonard Rose, San Jon, NM (US)

(73) Assignee: Managed Inventions, LLC, Fort Lauderdale, FL (US)

( * ) Notice: Subject to any disclaimer, the term of this patent is extended or adjusted under 35 U.S.C. 154(b) by 1715 days.

(21) Appl. No.: 10/766,129

(22) Filed: Jan. 28, 2004

(65) Prior Publication Data

US 2005/0163311 A1    Jul. 28, 2005

(51) Int. Cl.
*H04M 1/56*  (2006.01)
*H04M 15/06*  (2006.01)
*H04L 12/66*  (2006.01)

(52) U.S. Cl. .............. 379/142.07; 379/142.01; 379/142.04; 379/142.14; 379/142.15; 379/900; 370/352

(58) Field of Classification Search ............ 379/900, 379/216.01, 355.01, 142.07, 142.01, 142.04, 379/142.14, 142.15; 370/260, 352; 707/3; 345/785
See application file for complete search history.

(56) References Cited

U.S. PATENT DOCUMENTS

| | | | |
|---|---|---|---|
| 5,889,774 A | 3/1999 | Mirashrafi et al. | |
| 5,958,016 A | 9/1999 | Chang et al. | |
| 6,131,095 A | 10/2000 | Low et al. | |
| 6,141,413 A | 10/2000 | Waldner et al. | |
| 6,167,042 A | 12/2000 | Garland et al. | |
| 6,175,619 B1 | 1/2001 | DeSimone | |
| 6,185,194 B1* | 2/2001 | Musk et al. | 370/260 |
| 6,243,443 B1 | 6/2001 | Low et al. | |
| 6,278,454 B1 | 8/2001 | Krishnan | |
| 6,282,574 B1 | 8/2001 | Voit | |
| 6,339,644 B1 | 1/2002 | O'Neil et al. | |
| 6,430,175 B1 | 8/2002 | Echols et al. | |
| 6,466,570 B1 | 10/2002 | Low et al. | |
| 6,539,077 B1 | 3/2003 | Ranalli et al. | |
| 6,665,392 B1 | 12/2003 | Wellner et al. | |
| 6,876,633 B2* | 4/2005 | Strathmeyer et al. | 370/260 |
| 7,177,415 B1* | 2/2007 | Kim et al. | 379/216.01 |
| 2001/0005415 A1 | 6/2001 | Grunsted et al. | |
| 2002/0126155 A1* | 9/2002 | Lin-Hendel | 345/785 |
| 2002/0169764 A1* | 11/2002 | Kincaid et al. | 707/3 |
| 2003/0043787 A1 | 3/2003 | Emerson, III | |
| 2003/0163526 A1 | 8/2003 | Clarisse et al. | |
| 2003/0202504 A1 | 10/2003 | Dhara et al. | |
| 2007/0189500 A1* | 8/2007 | Stanford | 379/355.01 |

FOREIGN PATENT DOCUMENTS

| | | |
|---|---|---|
| WO | 98/56159 A1 | 12/1998 |
| WO | 03/021487 A2 | 3/2003 |

OTHER PUBLICATIONS

U.S. Appl. No. 10/298,671, filed May 22, 2003, Sakano et al.

* cited by examiner

*Primary Examiner*—Thjuan K Addy
(74) *Attorney, Agent, or Firm*—Lott & Friedland, PA

(57) ABSTRACT

A URL adapter for a Web browser that enables the integration of telephone numbers into a web browser's address line for parsing as a URI. The URL adapter bypasses traditional search hook functions to identify potential telephone numbers. The URL adapter has access to a name server for translating names entered into the browser into telephone numbers. The URL adapter can also parse Web pages to self-identify telephone numbers.

10 Claims, 2 Drawing Sheets

INTERNET TELEPHONY COMMUNICATIONS ADAPTER FOR WEB BROWSERS

SUMMARY OF THE INVENTION

The present invention relates generally to the field of Internet telephony and more particularly to an adapter that enables the integration of a telephone number into a World Wide Web browser as a Uniform Resource Identifier.

BACKGROUND OF THE INVENTION

Traditional landline telephone services are circuit-switched, meaning every call is transmitted over dedicated lines reserved for that particular call. Long distance calls are transmitted from the user's telephone line over copper wires to a local telephone company's network switch, which then converts the call to a digital format and hands it off to a long distance carrier. The long distance carrier then routes the call over its network to the local telephone company that serves the recipient of the call. That carrier's local network switch then converts the call from the digital format to analog signals and connects the call to a line serving the recipient. As long as the call is ongoing, a circuit—a dedicated splice of bandwidth—remains open throughout all three networks involved in transmitting the voice signals.

Unlike traditional landline telephone service, the Internet and similar types of networks are packet switched data networks that use specially formatted packets to carry digital data. The basic networking protocol that enables the communication of such packets across the interconnected networks forming the Internet, and between the computers with diverse hardware architectures and various operating systems that form such networks, is the Transmission Control Protocol/Internet Protocol ("TCP/IP"). While TCP/IP is an excellent protocol for accurately and efficiently transmitting most data packets over the Internet, it does not work as well with real-time data because delays can be introduced into the output stream. The protocol used to transmit real-time voice conversations over a data network using the Internet Protocol ("IP") is the Voice over Internet Protocol ("VoIP"). A VoIP enabled system is generally capable of handling a telephone call over the Internet in much the same manner as a TCP/IP enabled device is capable of handling a stream of data over the Internet, but without significant delays between packets.

In practice, an IP telephony user dials a toll-free number to connect the user to an IP telephony gateway. The gateway acts as a bridge between the public telephone network and the public or private IP network providing the service. Once connected to the gateway, the user generally dials (through a phone or computer controlled dialer) his or her account number (for billing purposes) and the destination telephone number of the call (although other arrangements which exclude the need to dial account numbers are also possible). The gateway receives the resulting telephone signals generated by the dialer on one side, converts them to IP packets, and outputs the packets to public or private IP networks for routing to the terminating user, and vice versa. A typical packet includes 10 to 30 milliseconds worth of conversation. Each packet is coded with the second party's telephone number, and compressed for rapid transmission.

The packets travel the IP network, passing through routers, computers that operate like switches by reading the addresses on each packet and assigning them to appropriate transmission lines, to arrive at a gateway that decompresses them and converts the packets back into a voice transmission signal. The gateway then passes the call to the local telephone network, which delivers it to the intended party.

In order to locate any specific point, or host, on the Internet, a unique IP address can be used for each host. A host can have a dedicated IP address, as is frequently the case with large bandwidth access customers, or a dynamically generated IP address, as is the case with any dial-up user. A number of users can also share a single IP address and rely on intra-network devices to identify which users are placing or receiving calls. Since IP addresses are numerical, and therefore difficult to remember, or dynamic, and therefore constantly changing, and because many users are connected to different hosts all the time, many users are also assigned more permanent types of addresses, such as a Simple Mail Transport Protocol ("SMTP") e-mail address or a Voice Profile for Internet Mail ("VPIM") voicemail system address. There are many other types of addressing mechanisms available on the Internet.

So as to technically accommodate the growing number of telephone users around the world, as well as an ever-increasing interest in Internet telephony, the International Telecommunication Union ("ITU") has adopted a number of additional standards or protocols. One such protocol is E.164, which provides a uniform means for identifying any telephone number in the world to any telephony user in the world. This protocol has been widely adopted, along with other protocols, such as H.323 and H.450, which collectively operate to improve the quality and functionality of IP telephony. As explained in more detail below, for purposes of the present invention the E.164 protocol is the most important.

(1) E.164. E.164 is the ITU Standardization Sector ("ITU-T") recommendation for Global Switched Telephone Network ("GSTN") numbering. E.164 is a sixteen digit numbering scheme that is presently capable of providing a unique telephone number for every subscriber in the world. The E.164 address provides a globally unique, language independent identifier for resources on public telecommunication networks. E.164 numbers are used to identify ordinary telephones, fax machines, pagers, and data modems.

(2) IP Address. An IP address, a basic component of the Internet Protocol, is a 32-bit number that identifies each unique host capable of sending or receiving information across the Internet. An IP address has two parts: an identifier of a particular network on the Internet; and an identifier of the particular host (the host can be a server or a workstation) within that network. To locate a particular host, a user could simply enter the IP address for that host into a World Wide Web ("WWW" or "Web") browser. A Web browser is software that greatly simplifies the use of the Internet. Web browsers allow computer users to easily navigate the Internet by assisting in the selection, retrieval, and interaction with various resources on the Web.

(3) Uniform Resource Identifier ("URI"). The URI can be used to identify any form of resource available over the Internet, such as a locator or a name, or both. The term Uniform Resource Locator ("URL") refers to the subset of URI that identify resources via a representation of their primary access mechanism (e.g., their network "location"), rather than identifying the resource by name or by some other attribute of that resource. The term Uniform Resource Name ("URN") refers to the subset of URI that are required to remain globally unique and persistent even when the resource ceases to exist or becomes unavailable. Since most users have a difficult time utilizing and remembering 32-bit numbers, such as the IP address, the URL was developed. The URL is presently an ASCII-based address that can lead or jump a user, by entering it into a browser, to a file on any computer connected to the Internet anywhere in the world. Efforts are presently underway to expand URLs beyond the ASCII character set, so characters from languages other than Latin-based languages, such as Kanji, could also be used. The standard convention for writing URLs is as follows: protocol to be used/host's name/ folder or directory on host/name of file or document requested. The Hypertext Transfer Protocol ("HTTP") is the protocol used to search host systems for displayable Web pages and related files. But other protocols, such as the File Transfer Protocol ("FTP"), which represents the simplest manner of exchanging files between computers on the Internet, as well as the "news" and "mailto" protocols could also be used. The host name is usually expressed using the domain name system ("DNS"). Different DNS servers connected to the Internet maintain databases of host names (IP addresses) that correspond to each domain name. Thus, when a user enters the text <www.xyz.com> into a browser, the text is parsed into search hook objects, a search engine is then used by the browser to search one or more servers for files, news, locations, etc., matching the search hook object, such as an IP address corresponding to that domain name. If a host, file or location can be located, the user is then directed or jumped accordingly. If no corresponding resource can be located using any of the available protocols, the user is provided other information, such as a "file not found" message. E-mail messages and many other different types of messages sent or received by hosts must similarly include IP addressing information in order operate.

(4) Hypertext Markup Language ("HTML"). HTML is the set of symbols, codes or words (the "markup") that is inserted in a file intended for display on a Web page. The markup tells a requesting browser how to display website pages, words and images for the user of that browser. Each individual markup code is referred to as an element. Some elements come in pairs that indicate when some display effect is to begin and when it is to end.

(5) IP Telephony Terminal. This term is generally used to refer to a set of facilities for managing the delivery of voice information using the IP. As previously noted, VoIP is one means of delivering voice data using the Internet Protocol.

While the preferred embodiment of the present invention relies on existing E.164 numbering management systems, the operation of the present invention is not dependent on these systems. At the present time, the ITU Telecommunication Standards Board assigns country/service codes, and within a geographic area, a national or regional numbering administration has the responsibility of managing the numbering plan for the countries assigned to that area. To have the E.164 number allocation process managed by the existing numbering plan administrations can expedite the allocation process, leading to an earlier deployment of Internet telephony services.

DETAILED DESCRIPTION OF THE INVENTION

Figure 1:
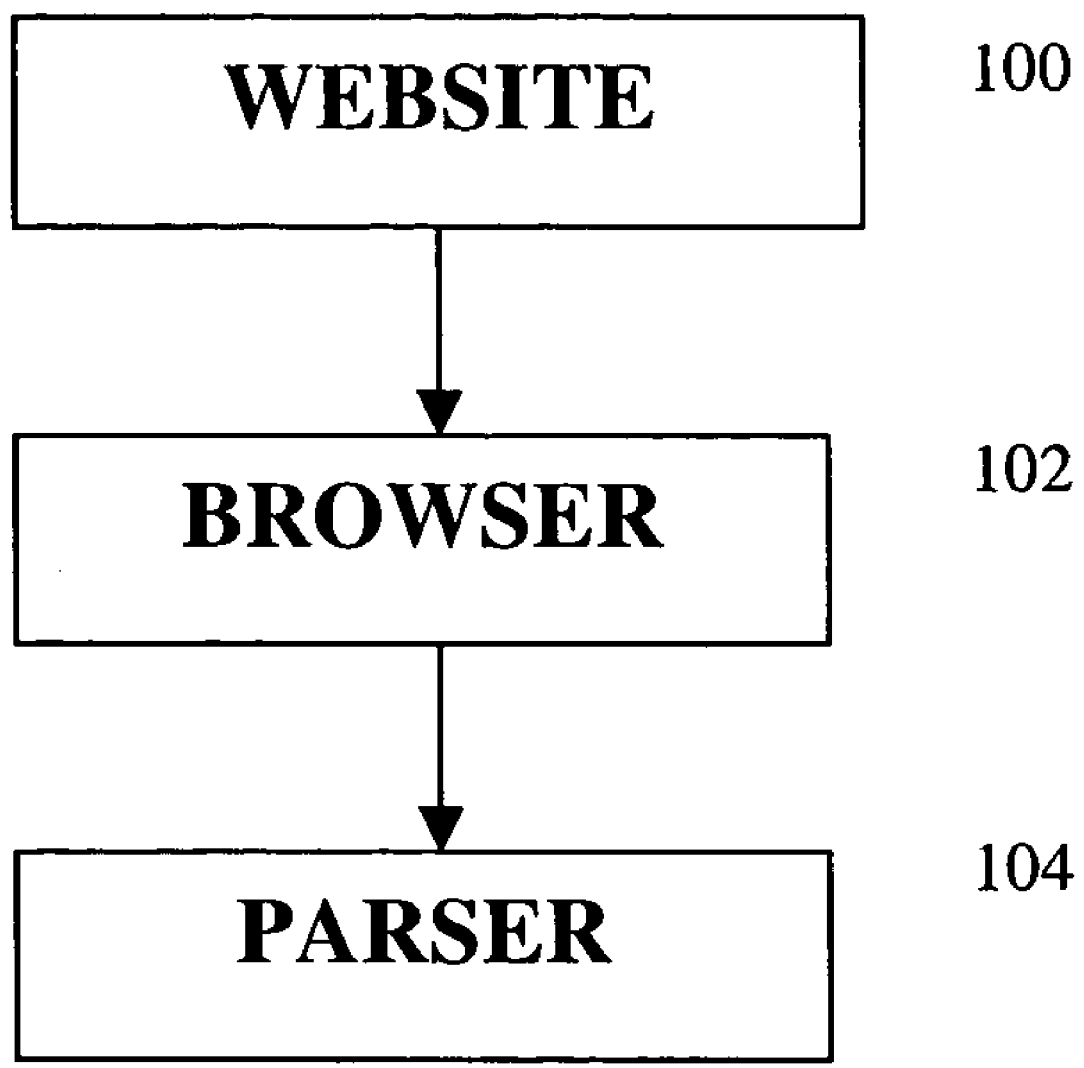
FIG. 1 is a diagram showing steps for converting a telephone number into a URI.

Internet service providers are interested in IP telephony because IP telephony increases the demand for access services and bandwidth. Consumers likewise are interested in IP telephony as it often means lower costs for telephone service. Consumers have been reluctant to use IP telephony, however, because many of the applications facilitating such services have been difficult to use, the quality of such services has not been as high as standard telephony, and there have been significant limitations on who can be called using IP telephony. The present invention simplifies the facilitation of such services by integrating a modular software application (a "plug-in") for utilizing IP telephony services into one or more presently available Web browsers, such as Internet Explorer, Netscape, Opera and Safari. The system thereby enables users to place and receive calls directly from a standard Web browser on their computers in the same simplified manner that users currently navigate the Internet through Web pages.

The plug-in is an adapter that is downloaded by users to enhance the operation of the Web browser currently installed on their personal computer. This adapter is referred to herein as a "URL adapter." In basic operation, after the user has downloaded the URL adapter to her computer, the user would create an account on an publicly available server, called the E.164 name server. E.164 name servers, or E.164 servers do not currently exist, but would be publicly available servers, probably operated by private service providers, that anyone on the Internet using a URL adapter could access. Once an account on the E.164 name server is established, the user can create names (like a proxy or token) corresponding to telephone numbers (a "telephone URL") for any telephone number in the world, and store those names on the server for subsequent access. To call a telephone URI, the user would simply enter the corresponding name into the address bar of the browser in the same manner that IP addresses or URLs are presently entered. Alternatively, the user could simply enter the numeric number sequence associated with a particular telephone number.

As further explained below in detail, when a name or proxy was entered into the address bar, the adapter would access the E.164 server and translate the name into a telephone number, which would then be dialed in accordance with the "dialto" protocol, a new protocol developed to facilitate the present invention. As with other URL protocols, the user could identify the dialto protocol in the same manner that other protocols are presently identified in the URI, for example by simply typing <dialto://2125551212> in the address bar. A dialto protocol compliant URL could also be used to create a hyperlink in the same manner that other URLs are used to create hyperlinks today. As expressed in HTML from within a hyperlink on a web page, the telephone URL specifying the dialto protocol, with a corresponding proxy, might appear as follows: <ahref="dialto://2125551212">NYCInformation</a>.

The dialto protocol does not require the subsequent specification of a "path" to another resource, like the http protocol, rather it is absolute and the text is case sensitive. Some characters are considered "reserved" and cannot be used in the free text fields without the characters being recognized as special commands. Examples include characters such as "user-name" and "password." Reserved characters can be represented as: =" "|":"|"?"|"|";"|"="

The dialto protocol syntax is formally described as follows:

| | |
|---|---|
| dialto-url = | scheme ":" scheme-specific-part |
| scheme = | 'dialto' |
| scheme-specific-part = | subscriber-id[type-specifier] |
| subscriber-id = | ["+"] telephone number |
| call-type = | "voice" |
| telephone number = | 1*phonedigit [pause-character*(telephonedigit\|dtmf-digit\|pause-character)] |
| telephonedigit = | digit \| "—" |
| pause-character = | "p" \| "w" |

-continued

```
digit =        "0" | "1" | "2" | "3" | "4" | "5" |
dtmf-digit =   "*"| "#" | "A" | "B" | "C" | "D"
```

The subscriber-id is the telephone number to be dialed. The subscriber-id should be written in international notation with country codes, as prescribed by the ITU-T, as well as with area codes. International telephone numbers must begin with a "+," which indicates that the number begins with a country code. Telephone numbers that only work from inside a particular geographical area or from a certain network are not required to start with a "+." Hyphens may be used, but are assigned no meaning and are only present to aid in readability.

Users could also create telephone URLs via a vertical child or sub-window provided by the adapter within the main browser window, rather than in the browser's address bar. The child window could also be used to display names and corresponding telephone numbers for telephone URLs and would readily enable a virtual E.164 name server, although such a server could also be implemented within the browser address bar. The E.164 virtual server is a function of the plug-in adapter on the local machine. For example, when an E.164 address is entered directly into the browser address bar, it is intercepted by the plug-in adapter before the browser itself can process it, and translated locally into an E.164 number by the plug-in adapter. If an E.164 number is entered into the child window, no interception is required. In either case, if a telephone URL is entered into the child window or the address bar, the plug-in adapter will consult with the public E.164 name server for resolution and translation.

Telephone URL resolution is accomplished by translating the URI in accordance with the dialto protocol. For example, if a Web browser supported the dialto protocol by default, it would attempt to automatically access the resource identified in the URL in the address bar using that default protocol. If the browser was not structured to support the default dialto protocol, the browser would attempt to identify the protocol from the URI, if listed. If the browser was still unable to identify the protocol, it would create search hook objects from the URI and proceed to search for those objects in the traditional fashion. However, if the URL adapter is installed, rather than perform a traditional search to find an appropriate resource, the URL adapter will intercept the URI and first attempt to locate a corresponding telephone number in the E.164 server.

Using the search hook objects created by the browser, the URL adapter will query each search hook object against the E.164 server until the address is translated or all of the search hook objects have been queried. If the URI cannot be translated in the E.164 server, it is passed back to the browser for traditional processing. If the search hook identifies an E.164 name server string from the system registry of the E.164 server, the string is passed to the browser as the final URL for the browser jump.

A POST string, a string entered by the user that is stored in the registry for a selected E.164 name server, may be used by the browser to attempt to access a URL. The string can also be used to form the final URL string passed to the browser by the translate function: This function formats the E.164 name server string (from registry) and forms the final URL to jump to. In such cases, the browser will not form any further objects for performing address translation and presumes that the address has been interpreted correctly.

The E.164 name server can be set by the user by typing "about:nameserver" in the address bar. Alternatively, the search hook has a property called "search" that can be used to direct a user to a Web page whereby a particular E.164 name server can be selected from a list. This will also set the search property of the search hook object to the selected E.164 name server string, which in turn puts this string in the registry by calling its method "SetRegistryNameServer." As several different service providers can operate E.164 name servers, the user can select a particular service provider for resolution and translation. Each provider selected by the user will have its own unique query string stored in the user's system registry. The user will then be notified by message, e.g., "Name Server Set:voiceglo" to identify the particular service provider being utilized. The current value of the E.164 name server will be provided when the E.164 name server is loaded.

The telephone URL scheme is ultimately used to direct the user's VoIP agent to place a call using the telephone network. A VoIP agent is any VoIP end point capable of placing and receiving telephone calls from the Public Switched Telephone Network ("PSTN"). The network in question may be a landline or mobile telephone network. If the telephone network differentiates between, for example, voice and data calls, or if the user agent has several different telecommunications systems at its disposal, it is possible to specify which kind of call (voice, fax or data) is requested. It is also possible to give information about the capabilities of the remote entity.

Another important feature of the present invention is that it is capable of parsing through standard Web pages to look for telephone numbers. As shown in FIG. 1, the URL adapter uses the browser 102 to parse through websites 100 using the parser module 104 to find telephone numbers. The adapter uses several methodologies, including predictive and adaptive algorithms, to identify telephone numbers.

In accordance with the present invention, the user's telephone number and password (or PIN) are first presented to the decentralized telephone switching systems for authentication purposes via a direct link from the user's desktop (web browser) and computer at which point the adapter has enabled a fully-functional telephone capable of initiating or receiving calls from other users of the Internet telephony as well as standard telephone subscribers throughout the world.

Figure 2:
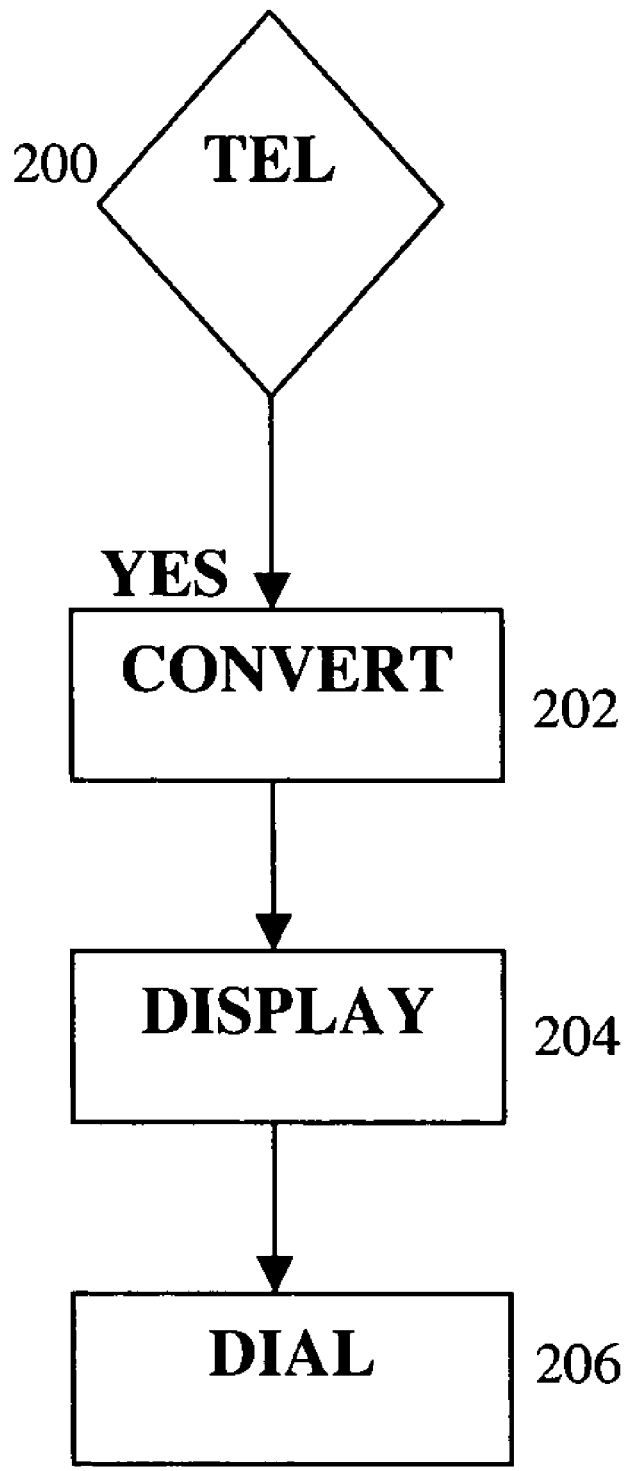
FIG. 2 is a flow chart showing the process for converting a telephone number.

As shown in FIG. 2, when documents on the Web are viewed using a browser, the document can be searched for any textual data that could possibly contain telephone numbers 200, whether represented in normal written or printed notation. In such cases, the URL adapter scans each page character by character, line by line as it is being loaded and rendered by the browser, transforming each telephone number that is detected and recognized into actual hyperlinks (URI) 202 that the embedded dialing module understands because an extension to the basic URI methods that the browser now understands has been implemented. The result of the parsing is the transformation of a sequence of telephone numbers into a URI 202 that is understood by the adapters parsing module. Some of the matching rules embedded into the parser include:

NNN NNN NNNN
NNN.NNN.NNNN
(NNN) NNN NNNN
NNN-NNN-NNNN
(etc.)

The parser converts the detected telephone number to a dialto://NNNNNNNNNN URI, then displays 204 it as a hyperlink on the page that triggers dialing action 206 by an embedded dial module for the specific protocol chosen.

Such a URI permits the user to click on the detected telephone number, which has now been transformed into a URI, and place a call using the appropriate dialing module of the invention for the specific protocol chosen. The embedded parser module enables the dialer module to be called every time a user clicks on the new URI. When this occurs, the specific protocol dialing function is performed because a dialer action has been assigned to the new URI that calls for a specific protocol dialer (SIP, IAX1, IAX2, MGCP, H323) module. This is accomplished from the desktop of the workstation through the web browser to the distributed proxy server(s) and/or gateways (servers) via the chosen protocol.

The separate modules of the URL adapter consist of those applications devoted to handling specific voice protocols and supporting the media chosen. Additional modules supporting directory lists, buddy lists, dial-pad, and video mail are integrated within the invention as well.

The URL adapter is driven from a distributed back-end consisting of telephone switches, web servers, and databases that provide authentication, routing calls to and from the PSTN, and from IP telephony user to IP telephony user in a direct peer mode (this assumes both users are also using the software and are connected to the same switching facilities). The invention, in conjunction with the aforementioned back-end systems, provides a method for an Internet user to communicate with any telephone whether it is connected via the Internet or connected via the standard PSTN.

What is claimed is:

1. A method for identifying a telephone number to a computer system for processing a telephone call over the Internet to a user assigned to said telephone number comprising:
   receiving data entered into said computer system by a caller through a web browser;
   searching said data for said telephone number or a proxy representing said telephone number;
   processing said telephone call through a packet switched data network to said telephone number if said telephone number is found in said data; and
   accessing a name server to translate said proxy into said telephone number for return to said computer system for processing said telephone call if said telephone number is not found in said data.

2. The method recited in claim 1, wherein the web browser translates the proxy in accordance with an established protocol.

3. The method recited in claim 2, wherein the protocol is the dialto protocol.

4. The method recited in claim 1, wherein the web browser creates search hook objects from said data entered into the computer system to translate said data when the web browser is unable to identify the established protocol.

5. The method recited in claim 4, wherein data that cannot be translated using search hook objects is transferred back to the web browser.

6. The method recited in claim 1, wherein said name server can store a proxy for a telephone number.

7. The method recited in claim 6, wherein the web browser provides a sub-window within the main web browser window on the computer system wherein a proxy for a telephone number can be created and stored for later access.

8. The method recited in claim 7, wherein the proxy consists of a name, letters, numbers, or symbols.

9. A system that allows users to place and receive calls using a web browser, said system comprising:
   a computer connected to a computer network;
   said computer equipped with a web browser;
   said web browser with the ability to parse web pages and identify a telephone number using a specified predictive or adaptive algorithm;
   said web browser enabled to convert a detected telephone number into a URI and provide the URI as a hyperlink;
   said computer enabled to obtain and display the URI provided by the web browser; and
   said web browser enabled to connect a user of the system with the telephone number associated with the URI by dialing the telephone number associated with the URI.

10. The system recited in claim 9, wherein telephone numbers can be dialed using the computer network or a circuit switched telecommunication network.

* * * * *